United States Patent
Calin et al.

(10) Patent No.: US 9,590,744 B2
(45) Date of Patent: Mar. 7, 2017

(54) METHOD AND APPARATUS FOR BEAMFORMING

(71) Applicant: Alcatel Lucent, Boulogne Billancourt (FR)

(72) Inventors: Doru Calin, Manalapan, NJ (US);
Aliye Ozge Kaya, Chatham, NJ (US);
Kai Yang, Belle Meade, NJ (US);
Simon Yiu, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/042,317

(22) Filed: Sep. 30, 2013

(65) Prior Publication Data

US 2014/0329485 A1    Nov. 6, 2014

Related U.S. Application Data

(60) Provisional application No. 61/820,166, filed on May 6, 2013.

(51) Int. Cl.
*H04B 15/02* (2006.01)
*H04B 7/02* (2006.01)
(Continued)

(52) U.S. Cl.
CPC ............. *H04B 15/02* (2013.01); *H04B 7/024* (2013.01); *H04B 7/0452* (2013.01); *H04B 7/0617* (2013.01); *H04K 3/00* (2013.01)

(58) Field of Classification Search
CPC .. H04K 2203/32; H04K 2203/34; H04K 3/43; H04K 3/825; H04K 1/02
(Continued)

(56) References Cited

U.S. PATENT DOCUMENTS 4,414,549 A * 11/1983 Wichmann ............. H01Q 1/247
                                                        342/16
4,876,545 A * 10/1989 Carlson ................... G01S 7/021
                                                        342/14
(Continued)

FOREIGN PATENT DOCUMENTS

JP       2004266776 A    9/2004
JP       2005192023 A    7/2005
WO    WO2012175360 A1   12/2012

OTHER PUBLICATIONS

Kai Yang et al: "Coordinated Dual-Layer Beamforming for Public Safety Network: Architecture and Algorithms", Communications (ICC), 2012 IEEE International Conference on, IEEE, Jun. 10, 2012, XP032274477—5 pages.
(Continued)

*Primary Examiner* — Hai V Nguyen
(74) *Attorney, Agent, or Firm* — Mendelsohn Dunleavy, P.C.; Edward Meisarosh; Steve Mendelsohn

(57) ABSTRACT

An example method of tactical communication is provided. The method includes receiving information indicating a tactical situation associated with a target area. The tactical situation is one of a missile in-flight, an eavesdropper, a signal jammer, and a transceiver located in a zone of interest. The method further includes performing a beamforming process including instructing transmission of a plurality of signaling beams from one or more transmitters toward the target area. The tactical situation may be associated with a foe and the plurality of signaling beams generate interference inhibiting communication with by the foe. The tactical situation may be associated with a friend and the plurality of signaling beams generate decodable signal for enhancing communication with the friend.

18 Claims, 15 Drawing Sheets

(51) Int. Cl.
*H04B 7/04* (2006.01)
*H04B 7/06* (2006.01)
*H04K 3/00* (2006.01)

(58) Field of Classification Search
USPC .................................. 455/1; 380/252, 254
See application file for complete search history.

(56) References Cited

U.S. PATENT DOCUMENTS

| | | | | |
|---|---|---|---|---|
| 5,163,176 A * | 11/1992 | Flumerfelt et al. | ........... | 342/174 |
| 5,379,043 A * | 1/1995 | Bishop | ................. | G01S 13/784 342/159 |
| 5,448,643 A * | 9/1995 | Parker | ...................... | H04K 1/00 342/42 |
| 5,646,623 A * | 7/1997 | Walters | .................... | G01S 13/32 342/112 |
| 5,940,033 A * | 8/1999 | Locher | ................ | H01Q 3/2611 342/19 |
| 5,952,965 A * | 9/1999 | Kowalski | ............ | H01Q 3/2611 342/372 |
| 5,974,236 A * | 10/1999 | Sherman | ............. | H04W 40/125 370/255 |
| 6,141,371 A * | 10/2000 | Holmes | ................... | G01S 19/21 342/17 |
| 6,385,434 B1 * | 5/2002 | Chuprun | ............... | B65H 31/24 399/405 |
| 6,483,454 B1 * | 11/2002 | Torre | ..................... | G01S 13/76 342/29 |
| 6,744,396 B2 * | 6/2004 | Stone | .................. | G08G 5/0008 340/945 |
| 7,672,400 B2 * | 3/2010 | Shapira | ............... | H04W 52/265 375/146 |
| 8,082,832 B1 * | 12/2011 | Tidwell et al. | ................ | 89/1.11 |
| 8,203,478 B1 * | 6/2012 | Huneycutt | ............... | H04K 3/28 342/14 |
| 8,237,602 B2 * | 8/2012 | Huneycutt, Sr. | ......... | H04K 3/28 342/13 |
| 8,301,075 B2 * | 10/2012 | Sherman | ............. | H04B 1/1036 340/539.1 |
| 8,711,963 B2 * | 4/2014 | Clerckx | ............... | H04B 7/0634 375/267 |
| 8,874,025 B2 * | 10/2014 | Shany | ..................... | H04K 3/43 455/1 |
| 8,948,683 B2 * | 2/2015 | Shany | ..................... | H04K 3/43 455/1 |
| 8,989,066 B2 * | 3/2015 | Merlin | ................. | H04W 28/26 370/310 |
| 9,014,665 B2 * | 4/2015 | Shany | ..................... | H04K 3/43 455/1 |
| 9,173,234 B2 * | 10/2015 | Merlin | .............. | H04W 74/0816 |
| 2003/0137444 A1 * | 7/2003 | Stone | .................... | G08G 5/0008 342/30 |
| 2004/0241622 A1 * | 12/2004 | White | ..................... | F41A 17/06 434/23 |
| 2005/0143013 A1 * | 6/2005 | Jha | ........................ | H04L 1/0001 455/69 |
| 2006/0120477 A1 | 6/2006 | Shen et al. | | |
| 2008/0143602 A1 * | 6/2008 | Mak | ........................ | H01Q 3/24 342/374 |
| 2008/0232238 A1 * | 9/2008 | Agee | ............................ | 370/208 |
| 2008/0268788 A1 * | 10/2008 | Bruas | .................. | H04B 17/382 455/67.13 |
| 2009/0097531 A1 * | 4/2009 | Franceschini | ......... | H04B 1/715 375/133 |
| 2009/0311963 A1 * | 12/2009 | Haverty | ................ | H04K 3/226 455/63.1 |
| 2010/0013696 A1 * | 1/2010 | Schmitt | ................... | G01S 7/024 342/54 |
| 2010/0278136 A1 | 11/2010 | Oyman et al. | | |
| 2010/0289688 A1 * | 11/2010 | Sherman | ............... | H04K 3/228 342/16 |
| 2010/0303034 A1 | 12/2010 | Chen et al. | | |
| 2011/0059689 A1 * | 3/2011 | Haverty | ................ | H04L 63/30 455/1 |
| 2011/0064159 A1 | 3/2011 | Ko et al. | | |
| 2012/0169522 A1 * | 7/2012 | Huneycutt, Sr. | ......... | H04K 3/28 342/14 |
| 2012/0214402 A1 * | 8/2012 | Shany | ..................... | H04K 3/43 455/1 |
| 2012/0214403 A1 * | 8/2012 | Shany | ..................... | H04K 3/43 455/1 |
| 2012/0214404 A1 * | 8/2012 | Shany | ..................... | H04K 3/43 455/1 |
| 2012/0267472 A1 * | 10/2012 | Pratzovnick | ......... | B64C 39/024 244/13 |
| 2013/0257655 A1 | 10/2013 | Hu et al. | | |
| 2013/0336224 A1 | 12/2013 | Davydov et al. | | |

OTHER PUBLICATIONS

Araujo D S V et al: "A Dual Band Steerable Cell Phones Jammer", Microwave and Optoelectronics Conference, 2007, IMOC 2007. SBMO/IEEE M TT-S International, IEEE, PI, Oct. 29, 2007, XP031223453, 5 pages.
PCT/US2014/036496—International Search Report—mailed on Aug. 21, 2014—4 pages.
PCT/US2014/036496—Written Opinion of the International Searching Authority—mailed on Aug. 21, 2014—6 pages.

* cited by examiner

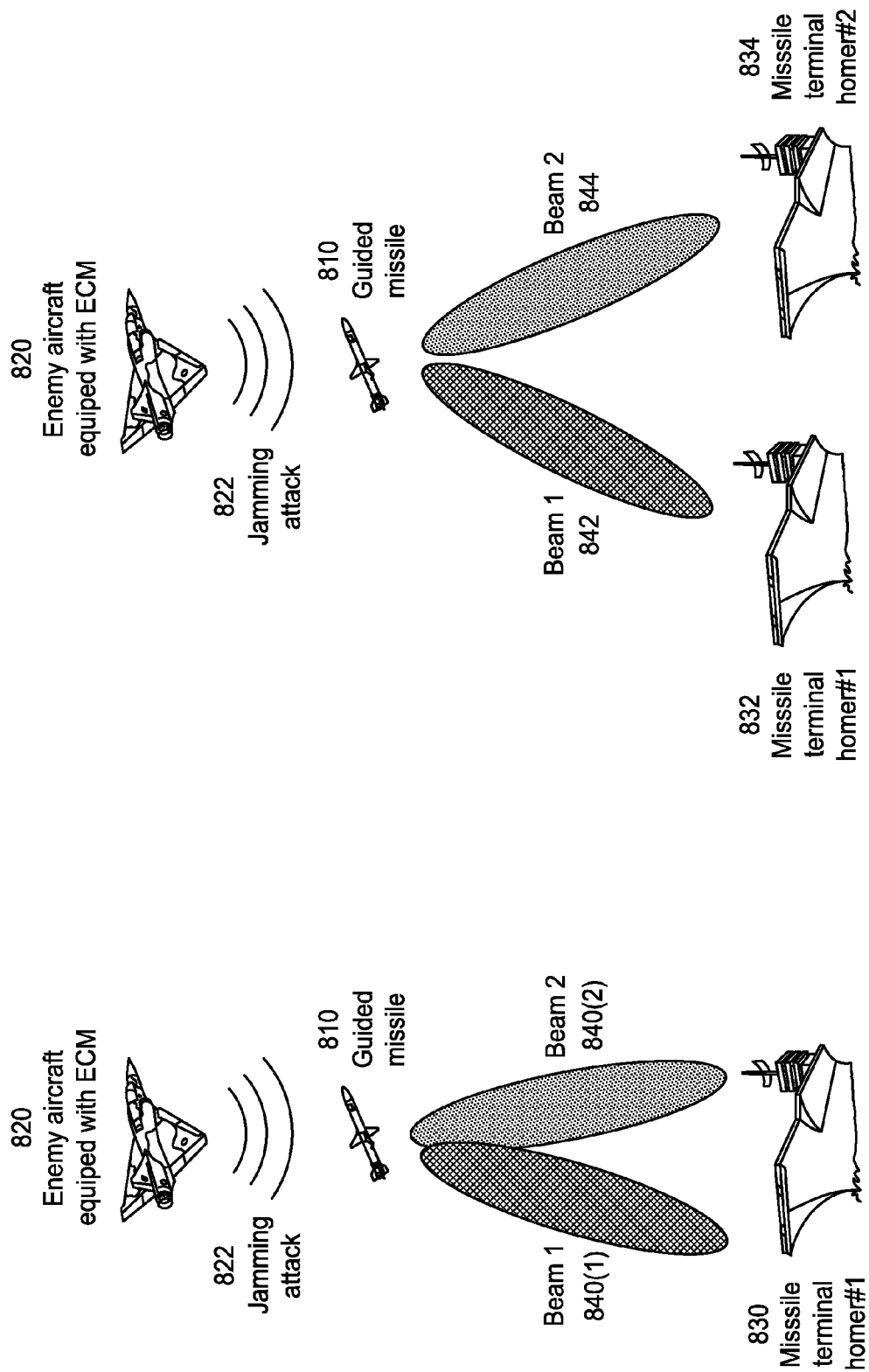

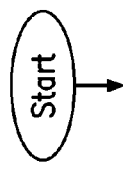

Command center units/s determine:
- A set of transceivers from all the available transceivers (e.g. Tx1)
- A set of beams from all the available beams of a selected transceiver (e.g. B2)
- A set of resources (e.g. frequency channels, secret codes) from all the available communication resources to operate on a selected beam of a selected transceiver (e.g. f1)

optionally transmitters (and receivers) may further form additional beams to create intentional jamming against potential eavesdroppers.

The command center(s) determines the time T1 when the set of transceivers, beams and resources will be refreshed and activate a timer which is set to T1

Embodiment 1: Set of transceivers, beams, resources (e.g., frequency channels, secret codes) follows an algorithm well known to both senders (e.g., command center and recipients) to minimize the search time for tuning to the appropriate channels Embodiment 2: Set of transceivers, beams, resources(e.g., frequency channels, secret codes) is explicitly communicated to intended receivers via a well protected channel (subject to strong encryption)

Embodiment 3: Set of transceivers, beams, resources (e.g., frequency channels, secret codes) is conveyed to intended receivers using hints or secret codes that are mutually known to the transmitters and intended recipients. Further, the intended receiver may determine the sequence of communication channels to tune to by processing some information (e.g. secret codes conveyed by the transmitters) according to an algorithm well known by the receiver.

Transmitter transmits a predetermined sets

Time = T0

*FIG. 12A*

METHOD AND APPARATUS FOR BEAMFORMING

REFERENCE(S) TO RELATED APPLICATION(S)

The present application claims priority from a provisional application, Ser. No. 61/820,166, entitled "METHOD AND APPARATUS FOR COORDINATED BEAMFORMING," filed May 6, 2013, which is commonly owned and incorporated herein by reference in its entirety.

FIELD OF THE INVENTION

The invention relates generally to communications and, in particular, to beamforming in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Commercial wireless networks are designed to provide ubiquitous mobile access across a large geographical area such as a 3G and/or 4G metro cellular networks, or to a hotspot area with dense users (such as the indoor systems, e.g. Femto, Pico, WiFi and the like). If the traffic demand is predicted to vary, the data traffic and the number of user equipment (UE) associated with a Base Station (BS) can be predicted by combining historical data with advanced statistical prediction methods and traffic imbalances among adjacent BSs compensated by load balancing techniques.

Public safety wireless network are designed to cover a large geographical area, with traffic demand across neighboring cells varying dramatically during emergencies in a particular cell. Such hotspot areas in the public safety network are random and the public safety network requires much higher levels of reliability, resilience, and security than commercial wireless networks.

There are several known technologies that are used to protect against jamming and eavesdropping. These known technologies includes data encryption algorithms and the use of security keys. Other of these known technologies include suitable access technologies designed to protect the transmission of information.

Examples of suitable access technologies designed to protect the transmission of information include Spread Spectrum communications and Ultra Wide Band communications. In Spread Spectrum communications (e.g., Direct Sequence Spread Spectrum—DSSS), the transmitted information bits are modulated with a user specific orthogonal Pseudo Noise (PN) sequence (e.g., Gold or Walsh code sequences), which spread the signal over a large bandwidth. A corresponding receiver is able to demodulate and decode the transmitted information that is received by employing the same PN sequence that was used by the transmitter. In Ultra Wide Band (UWB) communications, the information is sent through a train of narrow pulses (e.g., pulses with duration of nanoseconds) using low energy (i.e., transmission under the noise floor). At a corresponding receiver the transmitted information that is received can be retrieved by detecting and accumulating the energy from a train of such pulses, allowing for decoding.

However, eventually, in tactical communications, an enemy can develop algorithms and technologies to decode the transmitted information which is meant to be sent secretly to an intended receiver.

SUMMARY

An example method of tactical communication is provided. The method includes receiving information indicating a tactical situation associated with a target area. The tactical situation is one of a missile in-flight, an eavesdropper, a signal jammer, and a transceiver located in a zone of interest. The method further includes performing a beamforming process including instructing transmission of a plurality of signaling beams from one or more transmitters toward the target area. The tactical situation may be associated with a foe and the plurality of signaling beams generate interference inhibiting communication by the foe. The tactical situation may be associated with a friend and the plurality of signaling beams generate decodable signal for enhancing communication with the friend.

In one embodiment, the method includes determining the target area associated with the tactical situation with the target area is a present location of the tactical situation or an anticipated future location of the tactical situation.

In one embodiment, the method includes at least one of determining the one or more transmitters from a set of transmitters available for transmission to the target area, determining the plurality of beams from a set of beams available at the one or more transmitters, and determining resources from a set of communication resources available to operate on the plurality of beams of the one or more transmitters.

In one embodiment, the set of communication resources available to operate include one or more physical layer parameters. Physical layer parameter includes frequency, channel, time, space, power and/or code sequence.

In one embodiment, the method performing the beamforming process includes performing joint beam scheduling with the one or more transmitters, the one or more transmitters part of a set of transmitters that are capable of serving the target area.

In one embodiment, performing joint beam scheduling includes calculating a joint beamforming vector on a per-user basis using at least one of instantaneous channel feedback information or measured channel feedback information.

In one embodiment, the method may also include transmitting the plurality of signaling beams from the one or more transmitters toward the target area.

In one embodiment, the method includes performing another beamforming process including instructing transmission of another one or more signaling beams from another set of one or more transmitters toward the target area so as to signaling to the target area, and transmitting the another one or more signaling beams toward the target area.

In one embodiment, performing the another beamforming process includes determining the another one or more signaling beams of the one or more transmitters according to an algorithm known to the transceiver located in the zone of interest, explicitly communicating an identity of the another one or more signaling beams of the one or more transmitters to the transceiver located in the zone of interest via a well protected channel, or conveying the identity of the another one or more signaling beams of the one or more transmitters to the transceiver located in the zone of interest using hints or secret codes that are mutually known to the one or more transmitters and the transceiver.

In one embodiment, the method is embodied in a tangible processor-readable medium, the tangible processor-readable medium excluding signals and storing a set of instructions which when executed by a processor perform any one of the above described methods.

In one embodiment, a network equipment for a communication system is configured to communicate with other equipment in the system. The network equipment includes a processor and an associated memory unit, with the processor configured to perform any one of the above described methods.

BRIEF DESCRIPTION OF THE DRAWINGS

FIG. 8a-b illustrate an example of the use of coordinated beamforming technologies to guide an attacking missile against enemy jamming in an offensive strike.

FIGS. 12a, 12b and 12c is a logic flow diagram of functionality in accordance with one or more embodiments of the invention

Simplicity and clarity in both illustration and description are sought to effectively enable a person of skill in the art to make, use, and best practice the described embodiments in view of what is already known in the art. One of skill in the art will appreciate that various modifications and changes may be made to the specific embodiments described below without departing from the spirit and scope of the invention. Thus, the specification and drawings are to be regarded as illustrative and exemplary rather than restrictive or all-encompassing, and all such modifications to the specific embodiments described below are intended to be included within the scope of the invention.

DETAILED DESCRIPTION OF EMBODIMENTS

To provide a greater degree of detail in making and using various embodiments of the invention, a description of the approach taken to communications in networks, such a public safety, military communication and tactical wireless, and a description of certain, quite specific, embodiments follows for the sake of example.

Figure 1:
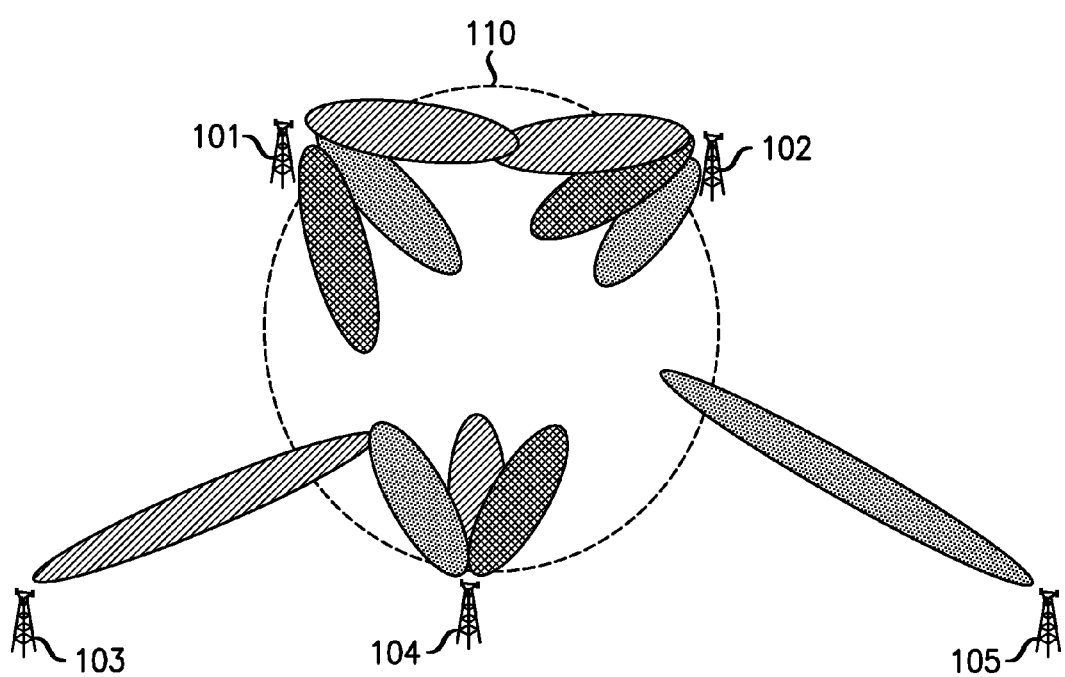
FIG. 1 is a depiction of downlink beam patterns activated in a wireless network, in accordance with one or more embodiments of the invention.
Figure 2:
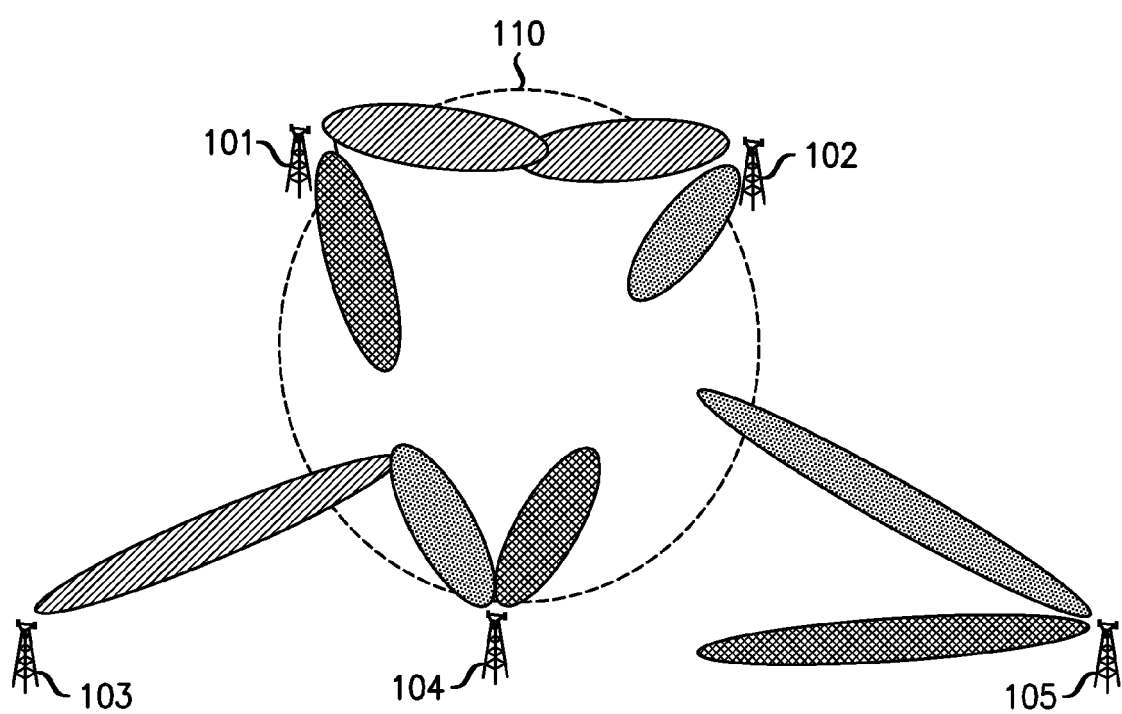
FIG. 2 is a depiction of uplink beam patterns activated in a wireless network, in accordance with one or more embodiments of the invention.

A coordinated beamforming (CoB) system proposed for highly reliable and spectrum-efficient communications in public safety and tactical wireless networks. Each BS is equipped with a beamforming antenna that is capable of choosing one or two or multiple beams from a set of beamforming patterns (e.g. pre-computed) according to the traffic condition. Such an approach could be utilized to address tactical or military threats. Further, such an approach could significantly enhance the system throughput and thereby increase the number of UEs that can be simultaneously connected. For example, as shown in FIGS. 1 and 2, when an emergency situation (e.g., a fire, medical, tactical and the like) occurs in a specific geographic area 110, nearby BSs 101-105 will illuminate beams toward the specific geographic area (i.e., target). The beam pattern activated by each BS is determined by the physical distance between a BS and the target (e.g., cell, incoming missile or area thereabout). If a BS is far away from the target cell, a beam with higher beamforming gain but narrower beam width is chosen. Also, in one embodiment, this beamforming approach may be combined with an advanced network MIMO approach to further suppress interference and enhance the system-wide capacity.

Some distinct features of the proposed approach are summarized below.

Fast response: A network should be able to quickly respond to emergencies (e.g., fire, medical, and/or tactical). For example, one example CoB system according to the principles of the invention could meet the demand for reliable data communications in a hot spot area with hundreds or even thousands of users by intelligently choosing a group of beamforming patterns and radiating a group of beams toward target areas. In doing so, the system can adaptively offer coverage to a hotspot area so as to guarantee necessary throughput performances of a selected group of users. With current electric devices able to switch beams very quickly, one example CoB system according to the principles of the invention is capable of accommodating a quickly increasing number of users in the hotspot area. For example, upon receiving information concerning an incoming guided missile, one example CoB system according to the principles of the invention could address that threat by intelligently choosing a group of beamforming patterns and radiating a group of beams toward target areas including the incoming missile.

Flexibility: In one embodiment, an example CoB system according to the principles of the invention is able to support non-emergency data communications and non tactical communications as well. The CoB system may meet such demand by flexibly adapting the beam patterns used by each BS to serve targets and/or users across different cells.

Resiliency: A beamforming antenna typically comprises a collection of antenna elements, and each of which may work independently or may jointly form beams. In case one antenna element fails to work, the remaining antenna elements could still work together to direct signals toward the desired target/s and/or users. A BS with traditional omni-antennas, by contrast, is comparably more vulnerable to antenna element failures, which could result in a coverage hole in the target area. In addition, in a CoB system embodiment, if a BS fails, a neighboring BSs could use an adjusted beam pattern with a higher beamforming gain to provide the desired result.

Security: Security is a vital feature of a network. A particular vulnerability of the wireless network is a potential wireless denial of service (WDoS) attack. In a WDoS attack, malicious nodes continuously bombard targeted BSs with various bogus requests and messages that may crash the wireless network. Such a DoS attack can be mitigated by forming a proper beam to suppress the signal from malicious nodes and thereby allow most legitimate users to access the BS. In a tactical situation, a proper beam can be formed to suppress an enemy's capabilities.

Energy efficiency: An omni-antenna has a uniform radiation pattern. A beamforming antenna, on the contrary, can radiate a signal toward only a selected target area and/or group of users. In doing so, beamforming antenna can achieve comparably similar throughput performance with much less power consumption.

Directional antennas have been widely used for both outdoor and indoor transmissions to enhance the coverage and throughput performance of commercial wireless networks. Various theoretical and experimental studies have indicated that the beamforming technology is an effective means to mitigate wireless interference and thereby increase system performance. Beamforming technologies can also be combined with other smart resource allocation schemes (e.g., fractional frequency reuse, power control or hybrid automatic repeat request (hybrid ARQ) schemes to further improve the throughput of a wireless system.

A standard approach to achieve the beamforming gain is to place a collection of antenna elements in a specific geometry, for example, circular, linear, or rectangular geometry. The shape of the beam radiated by a BS is determined by the specific set of weights applied to the antenna elements. In doing so, each BS can direct the beam to target area, cell and/or user so as to improve signal strength and/or increase or reduce a interference. The main lobe of a beamforming antenna represents the major direction of radiation.

Ideally, a beamforming antenna directs the signal to only the target area (i.e., the direction of the main lobe). The beamwidth of the main lobe usually decreases with more antenna elements, providing a much narrower and focused beam. However, in practice, the antenna can not completely remove the undesired radiation emitted in other directions (e.g., the side lobes) which may be quite significant as compared to the energy radiated from the main lobe.

Besides beamforming methods, a related technology used for improving link throughput, especially when the link Signal-to-Interference+Noise Ratio (SINR) is favorable, is Multi-Input-Multi-Output (MIMO) technology. As opposed to the beamforming technologies, MIMO technologies utilize the rich-scattering nature of the wireless channel and transmit different signals over different antenna ports. Note that each antenna port may include multiple antenna elements. If the channels between different pairs of transmitter and receiver antenna ports are sufficiently uncorrelated (i.e., there are many scatters in the environment), this approach can achieve a significant MIMO gain (e.g., a diversity or spatial multiplexing gain) and dramatically improve the link throughput.

Dual-layer beamforming technologies are promoted herein as an effective way to achieve both the MIMO gain and the beamforming gain. In the downlink transmission, the dual-layer beamforming technologies allow the transmitter to realize two layers of pre-processing. The goal of the first layer is to perform the beamforming whereas the goal of the second layer is to achieve the MIMO gain.

In some embodiments proposed herein, one or more antennas of a BS and/or a neighboring BS will radiate a signal toward an area where an emergency has occurred. This action may result in strong inter-cell interference. Accordingly, in some embodiments, coordinated multiple point transmission (CoMP) may be utilized to assist further suppression of the strong inter-cell interference and enhance the user throughput, especially at the cell boundary. CoMP refers to a framework of transmission/reception strategies that utilize geographically distributed antennas for coordinated data transmission and thereby reduce the inter-cell interference. Nodes participating in the cooperation are often required to exchange real-time information through the X2 interface. Coordinated beamforming (CB) and joint processing (JP) are two well-known realizations of the CoMP technologies. In one embodiment of a coordinated beamforming system, a UE receives information from only one BS while joint beam forming/precoding approaches are employed by neighboring BSs to cancel the inter-cell interference. The joint processing approach, in contrast, eliminates the interference by jointly transmitting information to a UE from multiple BSs. It has been shown that both schemes can significantly improve the system performance at the expense of extra data processing and transmission over the X2 interface. However, the realization of CoMP becomes increasingly difficult as the number of coordinating BSs increases, due to the errors in the channel feedback and the large amount of information that needs to be exchanged in real-time.

Figure 3:
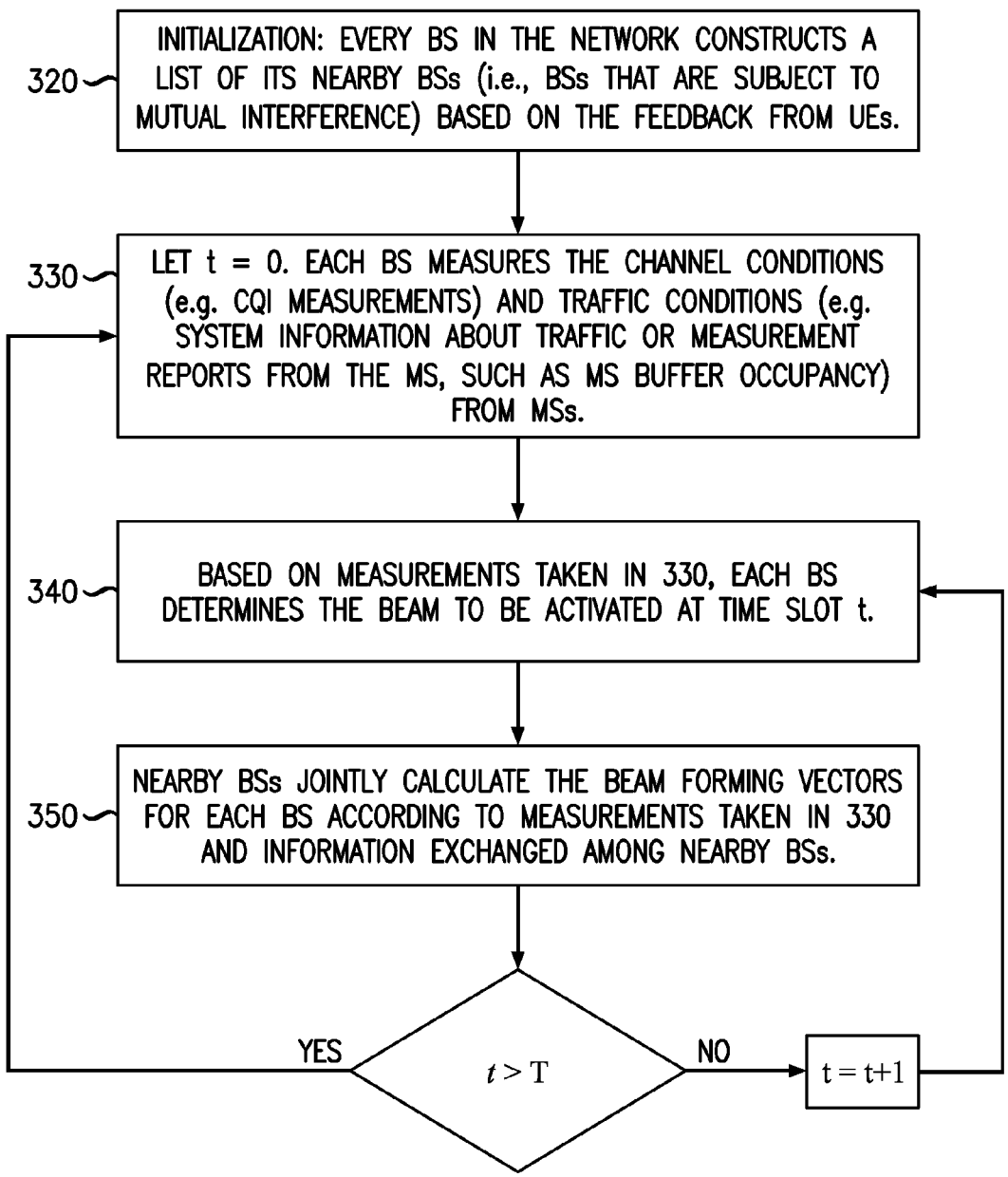
FIG. 3 is a logic flow diagram of functionality in accordance with one or more embodiments of the invention.

FIG. 3 is a logic flow diagram 300 of functionality in accordance with one or more embodiments of the invention. At the initialization stage (320), one constructs a group of neighboring BSs, (i.e., BSs that are subject to strong mutual interference). Note that the BSs pertaining to a group are not necessarily geographically adjacent to each other. In at least one embodiment, the level of interference between two BSs, can be measured by sending training sequences out from BSs to mobile stations (MSs) and the resultant measurement utilized to support the construction of the group. Depending on the embodiment, training sequences may be system information transmitted over control channels (e.g., broadcast channels). Here, an MS reads and reports back to at least one BS the identity of other BSs from which the MS is able to receive system information.

After the initialization stage, every BS measures (330) the channel periodically for each T time slots to capture the dynamics of the channel. In one or more embodiments, the time interval, T, is a system parameter which can be optimized for best system performance and minimal overhead. Based on the channel conditions (e.g., using Channel Quality Information (CQI) measurements) and traffic conditions (e.g., system information about traffic or measurement reports from the MS, such as MS buffer occupancy), the BSs determine (340) the beam patterns to use for transmission.

Illuminating multiple beams toward the same area may decrease the received signal-to-noise-plus-interference-ratio (SINR) at the User Equipments (UEs). Thus, in one or more embodiments, a second-layer joint beamforming processing is employed to further suppress the resulting interference (350). For example, nearby BSs jointly calculate the beam forming vectors for each BS according to measurements taken in 330 and the information is exchanged among nearby BSs. Also, in one embodiment, the second-layer beamforming is carried out on a per-user basis. For example, neighboring BSs exchange information through the X2 interferences and calculate a joint beamforming vector for every UE according to the measured channel feedback information.

Note that although the above procedure is described for downlink transmissions (i.e., transmission from BSs to MSs/UEs), a similar mechanism can be employed for uplink (i.e., transmissions from MSs/UEs to BSs). For instance, one can envisage that the set of interferers for uplink and downlink are different, in which case, a group does not necessarily have the same members for downlink and uplink, as depicted for example in FIG. 1 (downlink) and FIG. 2 (uplink). The groups in uplink can be formed in similar way to downlink, by measuring appropriate uplink system information (e.g., sounding signals and uplink channel quality feedback).

The detailed and, at times, very specific description above is provided to effectively enable a person of skill in the art to make, use, and best practice one or more embodiments of the invention in view of what is already known in the art. In the examples, specifics are provided for the purpose of illustrating possible embodiments of the invention and should not be interpreted as restricting or limiting the scope of the broader inventive concepts.

Figure 4:
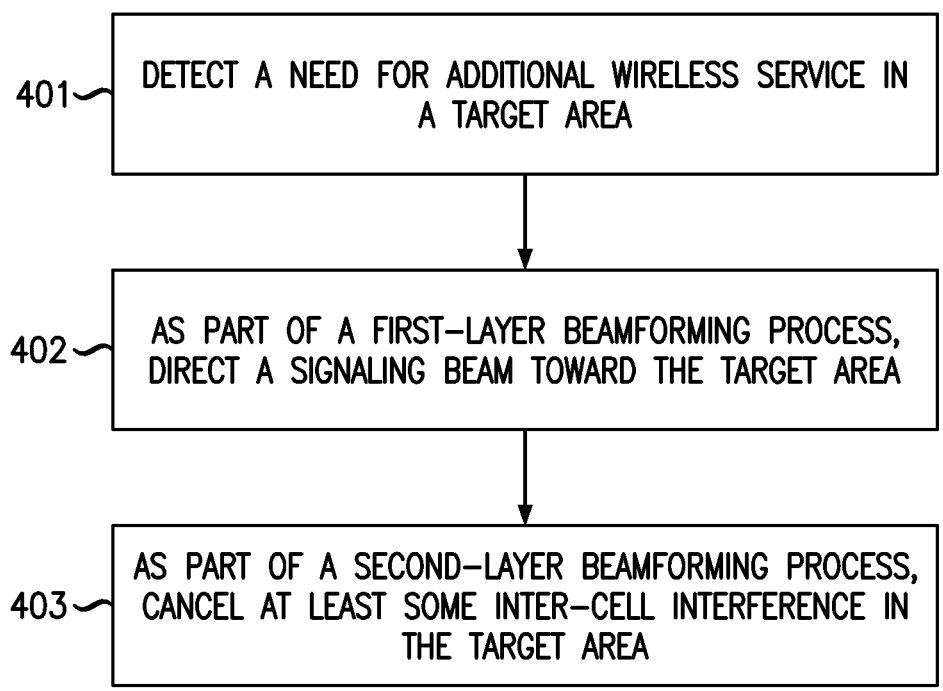
FIG. 4 is a logic flow diagram of functionality in accordance with one or more embodiments of the invention.
Figure 5:
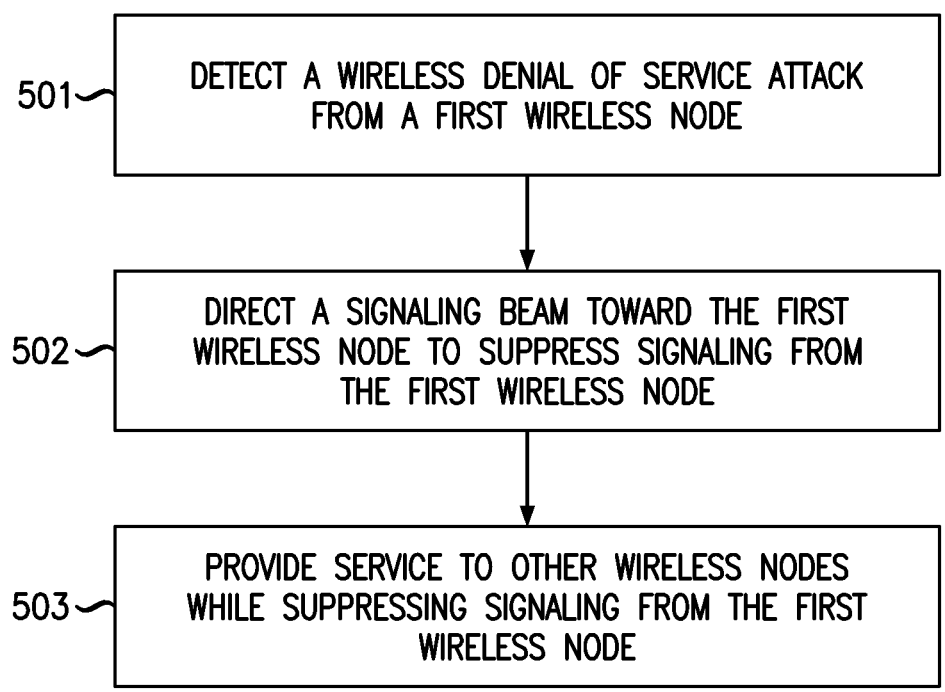
FIG. 5 is a logic flow diagram of functionality in accordance with one or more embodiments of the invention.

Aspects of one or more embodiments of the invention can be understood with reference to FIGS. 4 and 5. Diagram 400 of FIG. 4 is a logic flow diagram of functionality in accordance with one or more embodiments of the invention. In the method depicted in diagram 400, a need for additional wireless service in a target area is detected (401). As part of a first-layer beamforming process, a signaling beam is directed (402) toward the target area, and as part of a second-layer beamforming process, at least some inter-cell interference is canceled (403) in the target area.

Many embodiments are provided in which the method and logic flow above may be modified. For example, in many embodiments, detecting a need for additional wireless service in a target area includes detecting an emergency situation and/or a cell equipment failure affecting the target area. In one or more embodiments, performing the second-layer beamforming process includes facilitating coordinated multiple point transmission (CoMP) in providing wireless service for the target area. In one or more embodiments, performing the second-layer beamforming process includes performing joint beam scheduling with other base stations serving the target area. This joint beam scheduling may include calculating a joint beamforming vector on a per-user basis using instantaneous channel feedback information and/or measured channel feedback information.

Diagram 500 of FIG. 5 is a logic flow diagram of functionality in accordance with one or more embodiments of the invention. In the method depicted in diagram 500, a wireless denial of service (WDoS) attack from a first wireless node is detected (501). A signaling beam is directed (502) toward the first wireless node to suppress signaling from the first wireless node. While suppressing this signaling, service may provided (503) to other wireless nodes.

Figure 6:
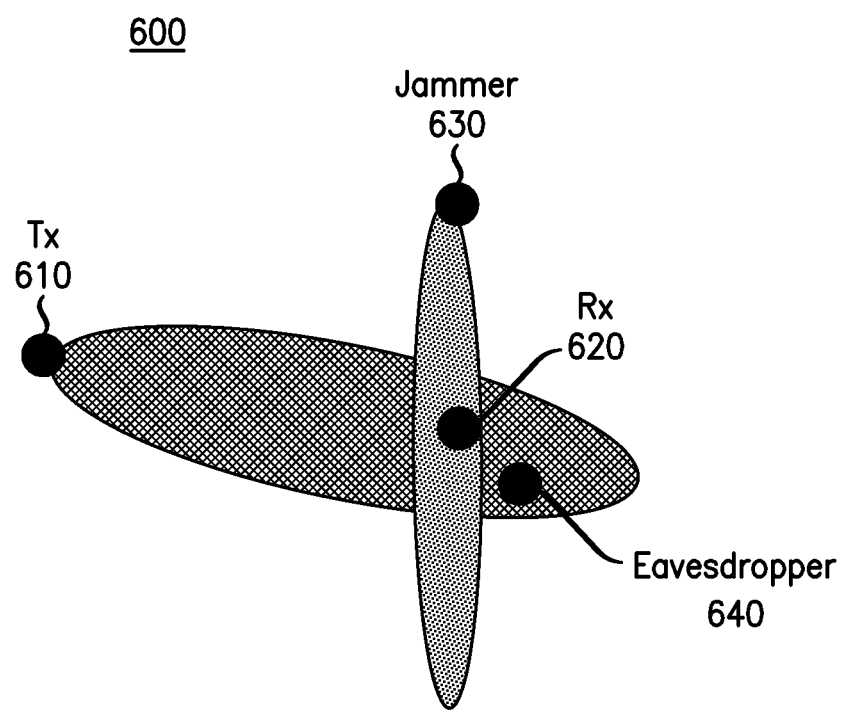
FIG. 6 illustrates a transmitter (Tx) and a receiver (Rx) according to one embodiment of the invention which may be subject to jamming and/or eavesdropping when in wireless communication.

FIG. 6 illustrates a transmitter (Tx) and a receiver (Rx) according to one embodiment of the invention which may be subject to jamming and/or eavesdropping when in wireless communication. A transmitter (Tx) 610 desires/needs to send secure information to a receiver (Rx) 620 in the presence of jammers and eavesdroppers. Such a scenario may arise in a military or tactical situation. A jammer 630 attempts to disrupt the communication between the transmitter Tx and the receiver Rx. An eavesdropper 640 attempts to decode the information sent to the receiver (Rx).

One or more embodiments according to the principles of the invention may utilize one or more the following:
  a single transmitter or multiple transmitters may simultaneously form multiple beams directed to the same user or to different target/s and/or user/s;
  a transmitter may simultaneously use Multi User Multiple Input Multiple Output (MU-MIMO) to transmit, jam, eavesdrop or a combination thereof.

Figure 7:
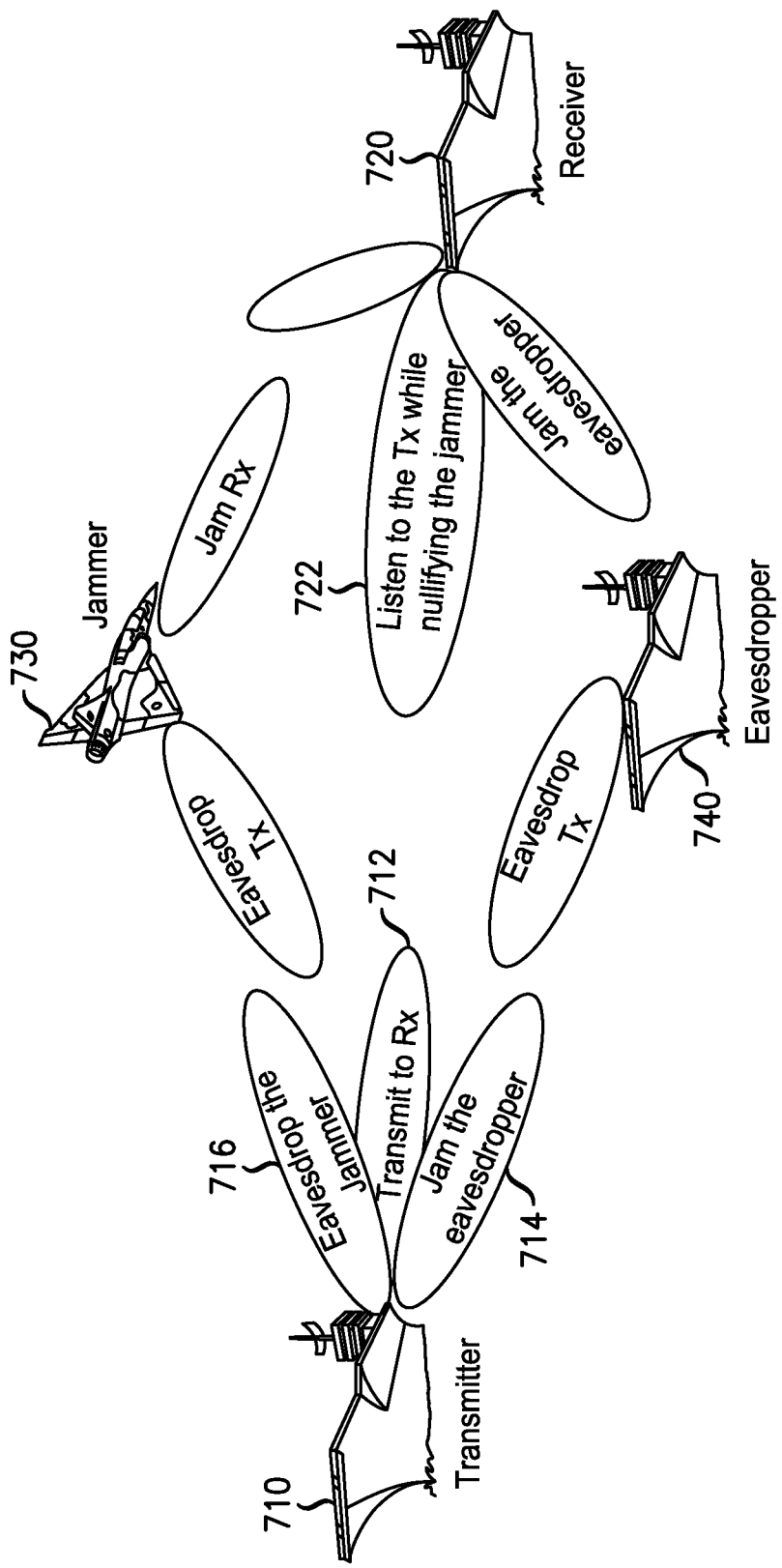
FIG. 7 illustrates an example transmitter (Tx) and an example receiver (Rx) according to one or more embodiments of the invention which may utilize beamforming technologies benefiting tactical wireless communications in the presence of adverseries.

FIG. 7 illustrates an example transmitter (Tx) and an example receiver (Rx) according to one embodiment of the invention which may utilize beamforming technologies benefiting tactical wireless communications in the presence of adverseries. FIG. 7 depicts a tactical communication scene example, in which a Tx 710 is attempting to send critical information securely to Rx 720. While sending critical information securely 712, to cope with the presence of jammers 730 and eavesdroppers 740, the transmitter Tx may form and direct beamed signals towards jammers and eavesdroppers. By directing intentionally fabricated signals to eavesdroppers (e.g., jamming the eavesdropper) 714, the TX can attempt to minimize the likelihood for eavesdroppers to decode critical information sent between Tx and Rx.

Furthermore, the Tx 710 may also attempt to proactively eavesdrop 716 on the enemy transmitters 730 (which in the illustrated example are co-located with the airplane jammer but may be otherwise located). In order to proactively eavesdrop, the TX 710 may use beam forming technologies to amplify the enemy communication signals which may be of interest, in the attempt to decode any critical information from the enemy or to merely detect the activity of the enemy (or adversary).

The Rx 720 may also use beamforming technologies to further increase the level of signal from the desirable transmitter (i.e., Tx 710) 722 in order to increase the likelihood of reception of the desired signal. The beam forming technologies employed at the Rx will also enable the Rx to nullify the signals 722 sent by jammers 730. Further, the Rx 720 may also beamform signals towards eavesdroppers 740 to intentionally jam the eavesdroppers.

In another embodiment, a transmitter (at the Tx and Rx illustrated in FIG. 7) can form beams with a multitude of degrees of freedom, exploring the diversity in frequency, time, space, power, code sequence and any other physical layer parameters differentiating signals from each other.

FIGS. 8*a-b* illustrate an example of the use of coordinated beamforming technologies to guide an attacking missile against enemy jamming in an offensive strike. FIG. 8*a* depicts a tactical communication scene example, in which a guided missile 810 has been launched and is in flight on an offensive strike against an enemy. An enemy jammer 820 (e.g., an enemy aircraft equipped with electronic counter measure (ECM) capabilities) may persist with a jamming attack 822 against guided missile 810. The offensive force may utilize transmitter Tx 830 to form and direct a plurality beamed signals 840(1), 840(2) towards guided missile in order to increase the likelihood of receipt of critical information securely sent to Rx 810 in the zone of interest and overcome the jamming attempt by the enemy. FIG. 8*b* depicts similar tactical communication scene with the exception that a plurality of transmitters Tx 832, 834 may be utilized to form and direct a plurality beamed signals 842, 844 toward guided missile. While only two transmitters are illustrated in FIG. 8*b*, additional transmitters may be utilized in other embodiments. While a single transmitter is illustrated to emit only a single beam in FIG. 8*b*, each transmitter may emit one or more beams.

Figure 9B:
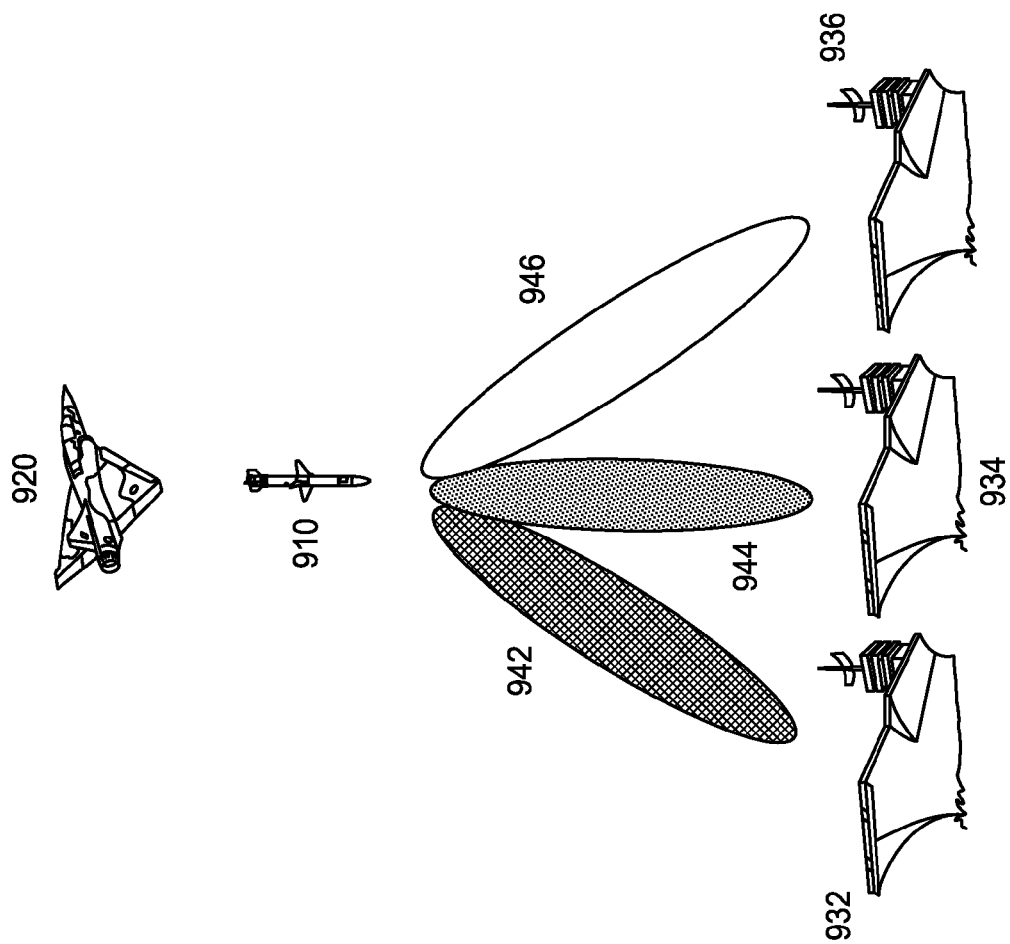
FIG. 9a-b illustrate an example of the use of coordinated beamforming technologies to disorient an attacking missile from and thereby provide a defense against the enemy missile.
Figure 9A:
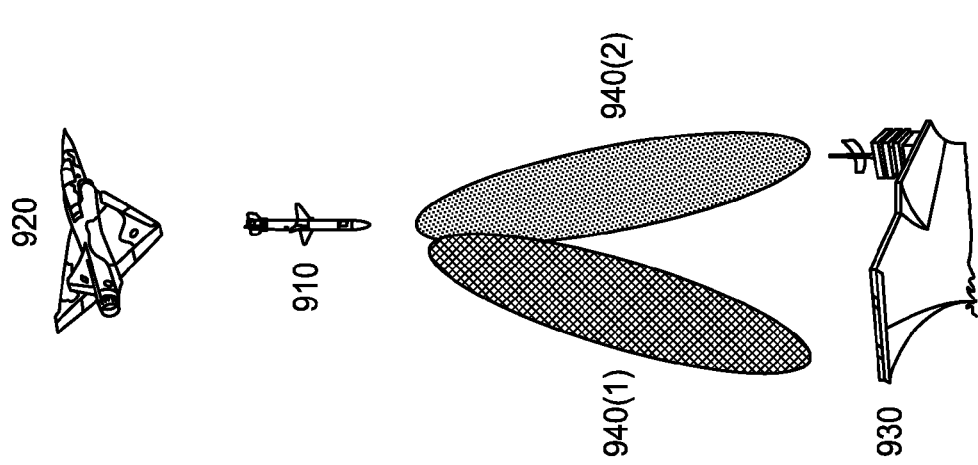

FIGS. 9*a*-*b* illustrate an example of the use of coordinated beamforming technologies to disorient an attacking missile from and thereby provide a defense against the enemy missile. FIG. 9*a* depicts a tactical communication scene example, in which a enemy guided missile 910 has been launched and is in flight. An enemy aircraft 920 may be in communication with the enemy guided missile 910. The defensive force may utilize transmitter Tx 930 to form and direct a plurality of beamed signals 940(1), 940(2) toward the enemy guided missile 910 in order decrease the likelihood of receipt of critical information from enemy aircraft 920 and/or to disorient the enemy guided missile 910. FIG. 9*b* depicts similar tactical communication scene with the exception that a plurality of transmitters Tx 932, 934, 936 may be utilized to form and direct a plurality beamed signals 942, 944 and 946 toward the enemy guided missile. While only three defensive transmitters are illustrated in FIG. 9*b*, additional transmitters may be utilized in other embodiments. While a single transmitter is illustrated to emit only a single beam in FIG. 9*b*, each transmitter may emit one or more beams.

Figure 10:
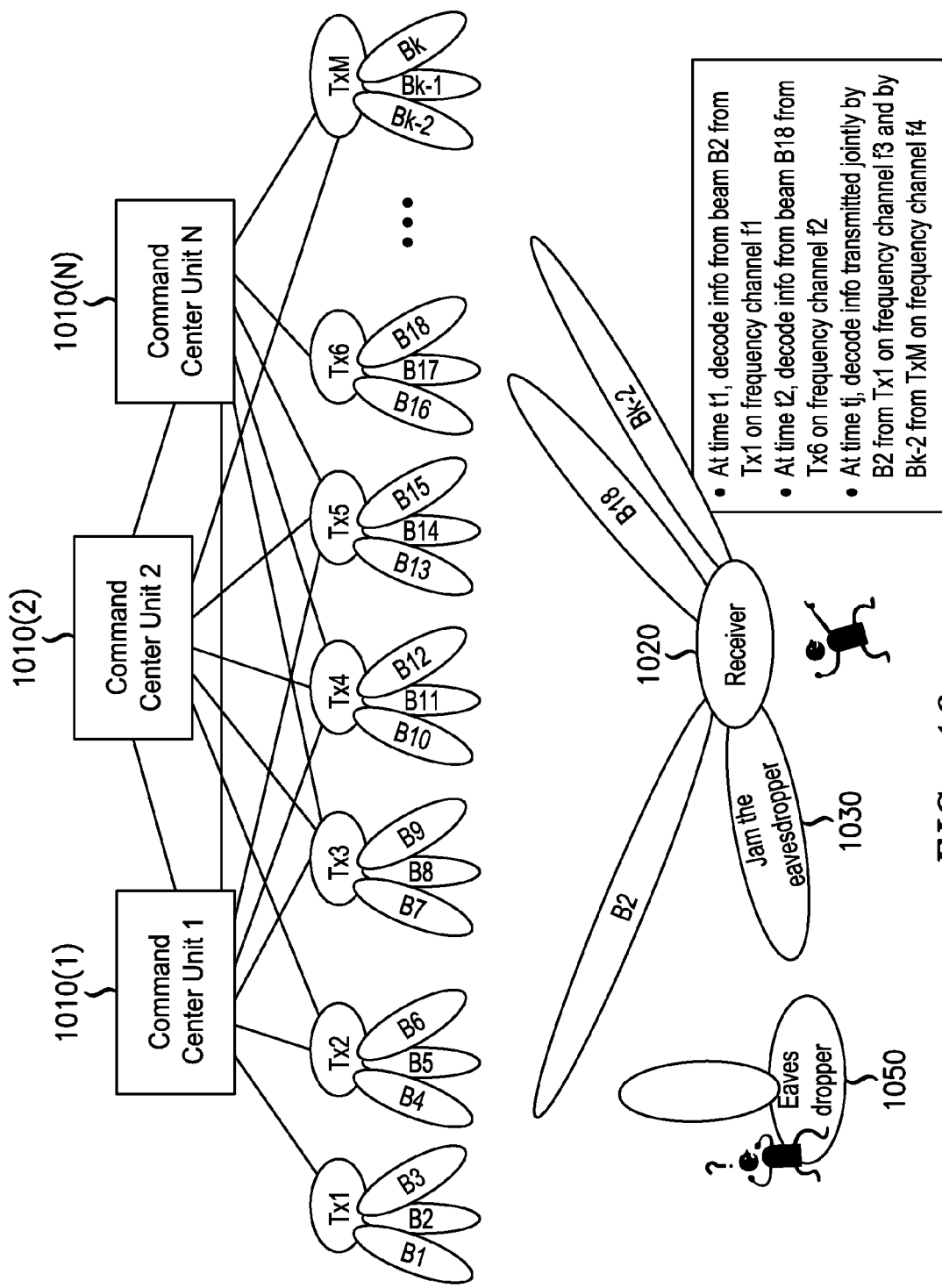
FIG. 10 illustrates an example of beam forming technologies implemented in one or more embodiments according to the principles of the invention.

FIG. 10 illustrates an example of beam forming technologies implemented in one or more embodiments according to the principles of the invention. In one instance, these embodiments can be employed in tactical (e.g., electronic warfare/battle field) scenarios. Critical information is conveyed from a command center (e.g., command center unit #1 1010(1), command center unit #2 1010(2), ... command center unit #N 1010(N) or a combination thereof) to intended receiver/s (e.g., receiver 1020). For example, command centers may be composed by several command centers units, which can be interconnected using a mesh networking technology for maximum reliability. Further, each command unit is connected to a number of transceivers (e.g., Tx1, Tx2, Tx3, ... TxM) capable to form at least one beam to an intended receiver. The beams formed at the transceivers (e.g., Tx1, Tx2, Tx3, ... TxM) may be utilized to convey data from several command center units/command centers simultaneously to multiple receivers (with only one receiver, 1020, being shown for ease of illustration).

More precisely, each transceiver is capable to transmit on a number of beams, TB, and to receive on a number of beams, RB. TB and RB are transceiver specific. For simplicity, all transceivers in FIG. 10 are illustrated with three (3) beams (TB=RB=3) with the beams being numbered sequential left to right for ease of understanding. For example, a first transceiver (Tx1) is able to transmit on beam one (B1), beam two (B2) and beam three (B3); a second transceiver (Tx2) is able to transmit on beam four (B4), beam five (B5) and beam six (B6); an Mth transceiver is able to transmit on beam k-2 (Bk-2), beam k-1 (Bk-1) and beam k (Bk). As illustrated, when there are M transceivers and each transceiver has three beams, the total number of beams is k which is equal to M*3. In one embodiment, TB and RB may differ for each transceiver; and, TB and RB may have an integer value greater than zero.

According to the principles of the invention, critical information is conveyed between the command center units and intended targets and/or recipients by intelligently determining at any instant, one or more of:
  a set of transceivers from all the available transceivers;
  a set of beams from all the available beams of a selected transceiver; and
  a set of resources (e.g., frequency channels, code sequences, other physical layer parameters) from all the available communication resources to operate on a selected beam of a selected transceiver.

In one embodiment, the determined channels can be used to communicate back and forth between the command center and receiver units. In one embodiment, the determined channels can be used to communicate signaling beams from the command center to an enemy target/s. The communication between command center and receiver units can be broadcast, multicast or unicast in nature.

The selection of transceivers, beams, resources (e.g. frequency channels, secret codes and the like) to be used at a given time instance can be made according to an algorithm that is well known to both senders (e.g., command center/s) and recipients to ensure minimization of the search time for tuning to the appropriate communication channels. Resource selection may follow a sequence/pattern that is determined by the intelligence available at the transmission side (i.e., command center).

In one embodiment, the sequence/pattern of the set of communication channels (e.g., transmitters, beams, frequencies, etc.) to be next used and to which the intended receivers should tune in order to decode critical information, may be explicitly communicated to intended receivers via a well protected channel (e.g., a channel subject to a level of encryption (e.g., strong encryption)).

In another embodiment, the information regarding the set of communication channels to be used can be further conveyed by using hints or secret codes that are mutually known to the transmitters and the intended recipients. Further, the intended receiver may determine the sequence of communication channels to tune to by processing some information (e.g., the secret codes conveyed by the transmitters) according to an algorithm well known to the receiver.

FIG. 10 shows a number of communication instances, where critical information is sent as following:
  at time t1 by transmitter Tx1 using beam B2 on frequency channel f1;
  at time t2 by transmitter Tx6 using beam B18 on frequency f2; and
  at time t3 jointly by transmitter Tx1 using B2 on frequency f3 and transmitter TxM using Bk-2 on frequency f4.

As illustrated, beam steering may be utilized to create unique spatial channels with different PHY properties. Critical information may be sent either on a single beam or on multiple beams at any time. In the later case, the intended receiver is able to combine and decode the information sent across multiple beams. The command center unit(s)/command center may switch transmitters, beams, frequency channels, et cetera, and the like and may use any combination of those communication resources at any instant, as long as the receiver can quickly tune to the new set of communication resources in use.

In any case, the level of diversity provided by the embodiments disclosed here for conveying critical information between transmitters and intended receivers makes it much more difficult for a non-intended recipient (eavesdropper, enemy receiver) to decode critical information.

In accordance to the principles disclosed herein, in one or more embodiments, either or both transmitters and receivers may create intentional jamming against potential eavesdroppers. This concept is also illustrated in FIG. 10, where the intended receiver beamforms a signal 1030 which jams the eavesdropper 1050. Furthermore, one or more of the beams from transmitters Tx1 through TxM may be additionally utilized to intentionally jam the eavesdropper.

Figure 11:
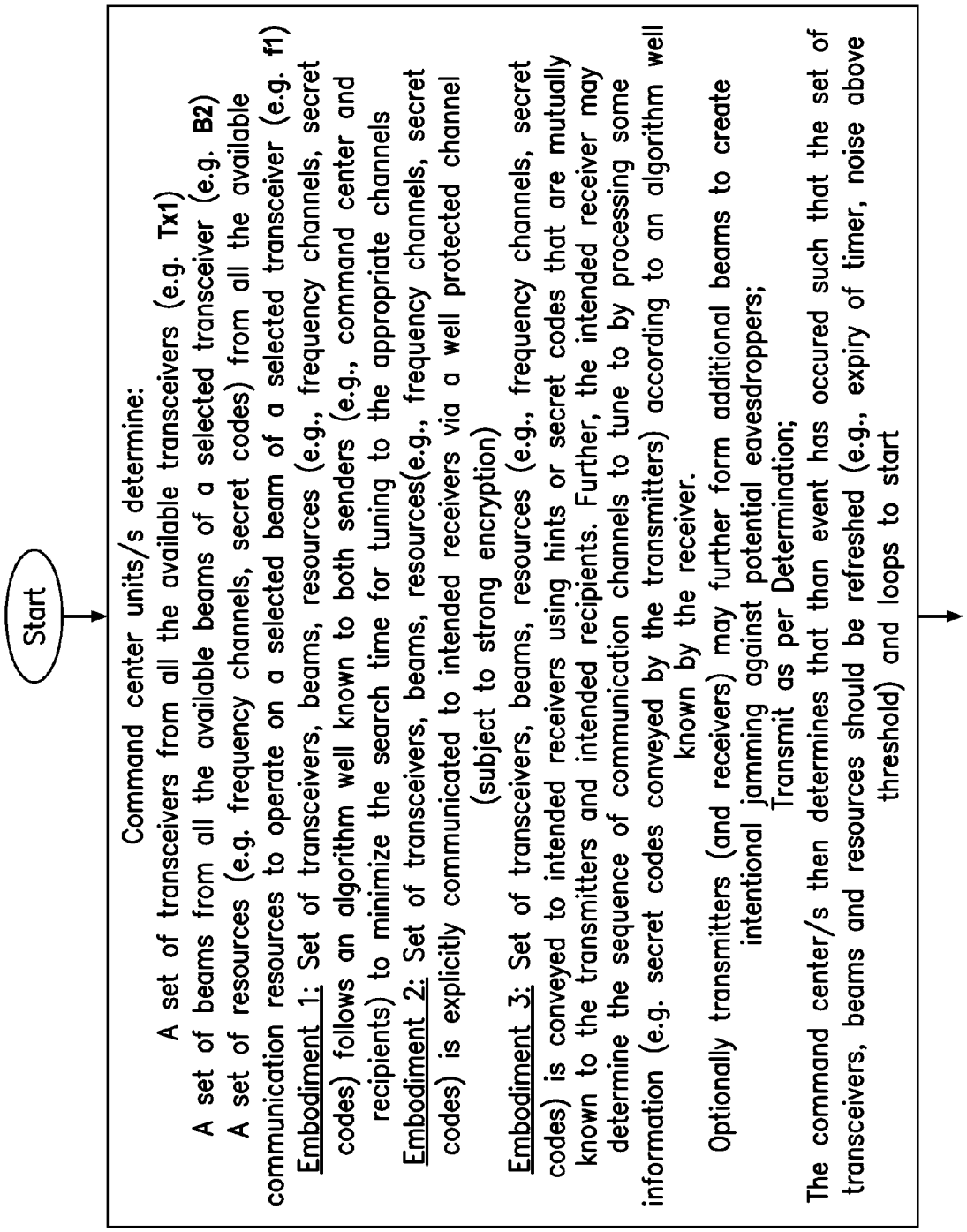
FIG. 11 is a logic flow diagram of functionality in accordance with one or more embodiments of the invention.

FIG. 11 is a logic flow diagram of functionality in accordance with one or more embodiments of the invention. As illustrated in FIG. 11 command center unit/s determine a set of transceivers, a set of beams from all the available beams of a selected transceiver, and a set of resources to be utilized to transmit information to a target receiver. The command center unit/s determine a set of transceivers from all the available transceivers (e.g., Tx1 of FIG. 10). The command center unit/s determine a set of beams from all the available beams of a selected transceiver (e.g., B2 of FIG. 10). The command center unit/s determine a set of resources (e.g., frequency channels, secret codes, physical layer resources, et cetera) from all the available communication resources to operate on a selected beam of a selected transceiver (e.g., a first frequency f1).

In one embodiment, the determination of the set of transceivers, beams, resources (e.g., frequency channels, secret codes) follows an algorithm well known to both senders (e.g., command center and recipients) to minimize the search time for tuning to the appropriate channels.

In one embodiment, the determination of the set of transceivers, beams, resources (e.g., frequency channels, secret codes) is explicitly communicated to intended receivers via a well protected channel (e.g., subject to a level of encryption such as strong encryption).

In one embodiment, the determination of the set of transceivers, beams, resources (e.g., frequency channels, secret codes) is conveyed to intended receivers using hints or secret codes that are mutually known to the transmitters and intended recipients. Further, the intended receiver may determine the sequence of communication channels to tune to by processing some information (e.g. secret codes conveyed by the transmitters) according to an algorithm well known by the receiver.

Optionally transmitters (and receivers) may further form additional beams to create intentional jamming against potential eavesdroppers. Command center unit/s then instruct the Transceivers (Tx1-TxM, as necessary) to transmit as per the determined set of transceivers, beams, resources.

The command center/s then determines that event has occurred such that the set of transceivers, beams and resources should be refreshed (e.g., expiry of timer, noise above threshold) and loops to the start.

Figure 12B:
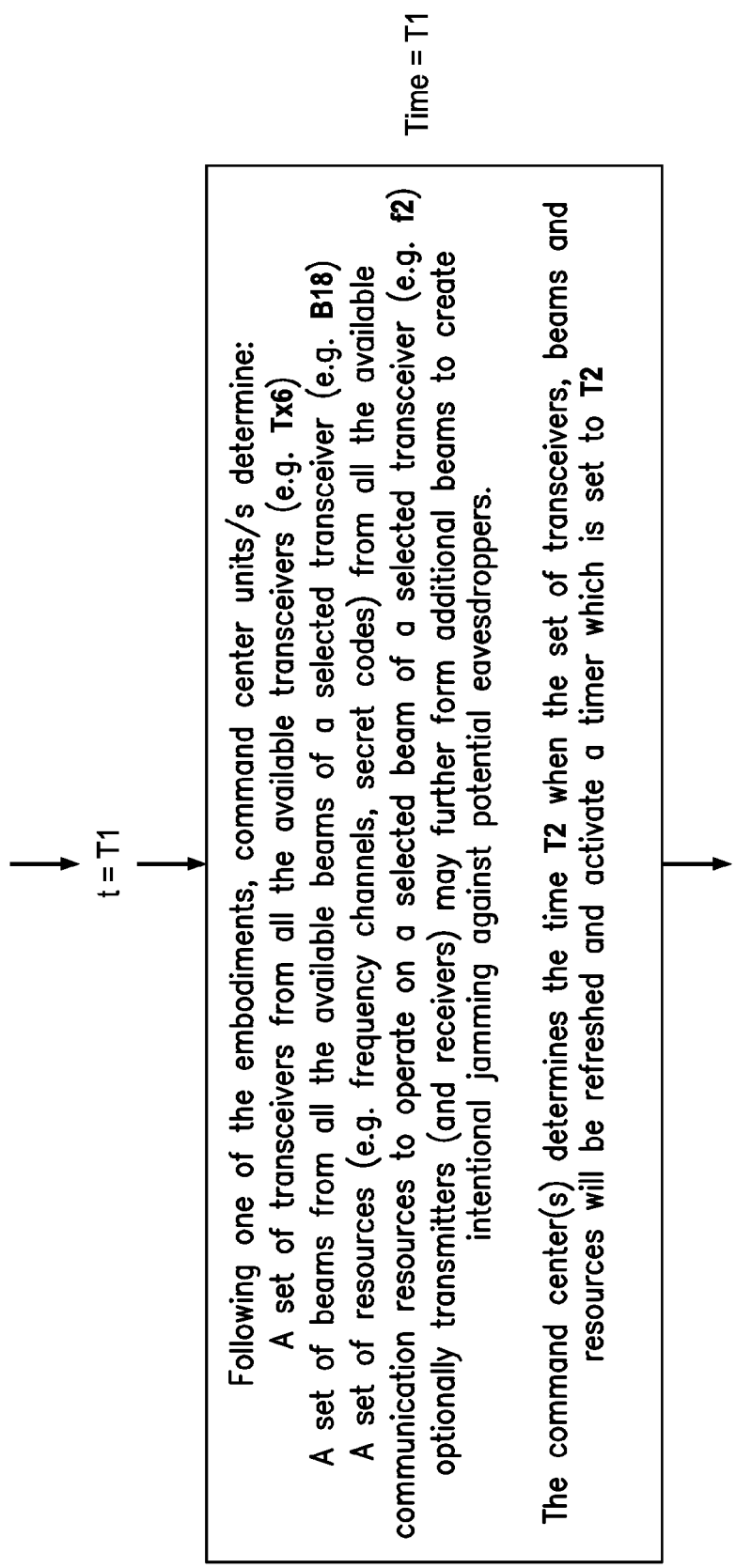
Figure 12C:
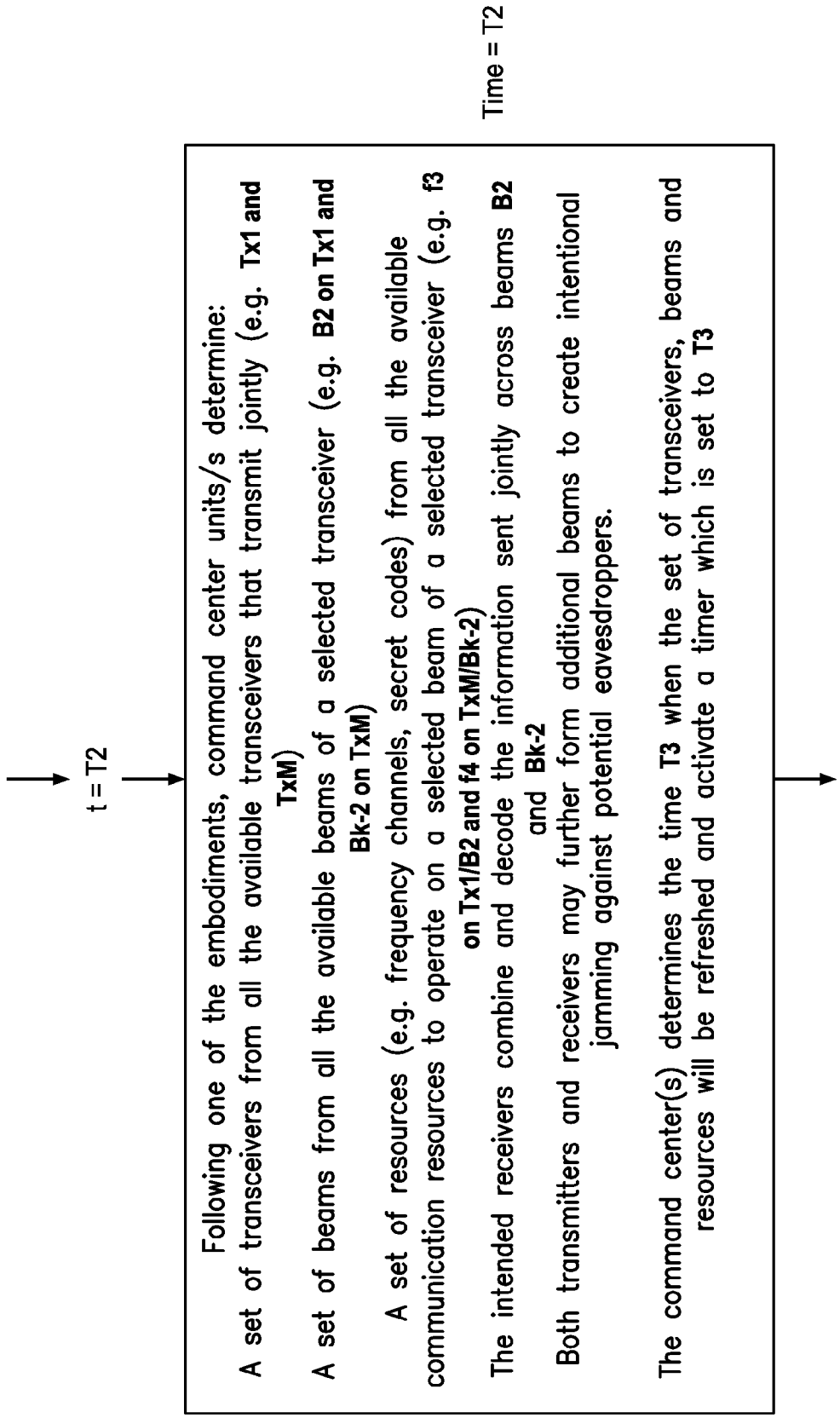

FIGS. 12a, 12b and 12c is a logic flow diagram of functionality in accordance with one or more embodiments of the invention.

As illustrated in FIG. 12a, at time T0, command center unit/s determine a set of transceivers, a set of beams from all the available beams of a selected transceiver, and a set of resources to be utilized to transmit information to a target receiver. The command center unit/s determine a set of transceivers from all the available transceivers (e.g., Tx1 of FIG. 10). The command center unit/s determine a set of beams from all the available beams of a selected transceiver (e.g., B2 of FIG. 10). The command center unit/s determine a set of resources (e.g., frequency channels, secret codes, physical layer resources, et cetera) from all the available communication resources to operate on a selected beam of a selected transceiver (e.g., a first frequency f1). The determination of the set of transceivers, beams, resources may among others methods be determined by following an algorithm well known to both senders, via explicit communication to intended receivers via a well protected channel, or by conveyance to intended receivers using hints or secret codes that are mutually known to the transmitters and intended recipients or require further processing according to an algorithm well known by the receiver.

The command center/s also determine the time T1 when the set of transceivers, beams and resources will be refreshed and activates a timer which is set to T1. The transmitter/s transmit a per determined set of transceivers, beams and resources until the expiry of the timer.

Continuing to FIG. 12b, following passage of time, time advances to time T1. At time T1, the command center unit/s determine: another set of transceivers from all the available transceivers (e.g., Tx6 of FIG. 10); a set of beams from all the available beams of a selected transceiver (e.g., B18 of FIG. 10); and a set of resources (e.g., frequency channels, secret codes) from all the available communication resources to operate on a selected beam of a selected transceiver (e.g., another frequency f2). Again, optionally transmitters (and receivers) may further form additional beams to create intentional jamming against potential eavesdroppers.

The command center/s also determine a time T2 when the set of transceivers, beams and resources will be refreshed and activate a timer which is set to T2. The transmitter/s again transmit on the determined set of transceivers, beams and resources until the expiry of the timer T2.

Continuing to FIG. 12c, following passage of time, time advances to time T2. At time T2, command center unit/s determine: yet another set of transceivers from all the available transceivers for joint transmit (e.g., Tx1 and TxM in FIG. 10); a set of beams from all the available beams of a selected transceiver (e.g. B2 on Tx1 and Bk−2 on TxM in FIG. 10); and a set of resources (e.g., frequency channels, secret codes) from all the available communication resources to operate on a selected beam of a selected transceiver (e.g. a third frequency f3 on Tx1/B2 and a fourth frequency f4 on TxM/Bk−2). Signals are communicated on the determined set of transceivers, beams, resources.

The intended receivers combine and decode the information sent jointly across beams B2 and Bk−2. One of or both transmitters and receivers may further form additional beams to create intentional jamming against potential eavesdroppers.

The command center/s determines the time T3 when the set of transceivers, beams and resources will be refreshed and activate a timer which is set to T3. The transmitter/s again transmit on the determined set of transceivers, beams and resources until the expiry of the timer T3.

Figure 13:
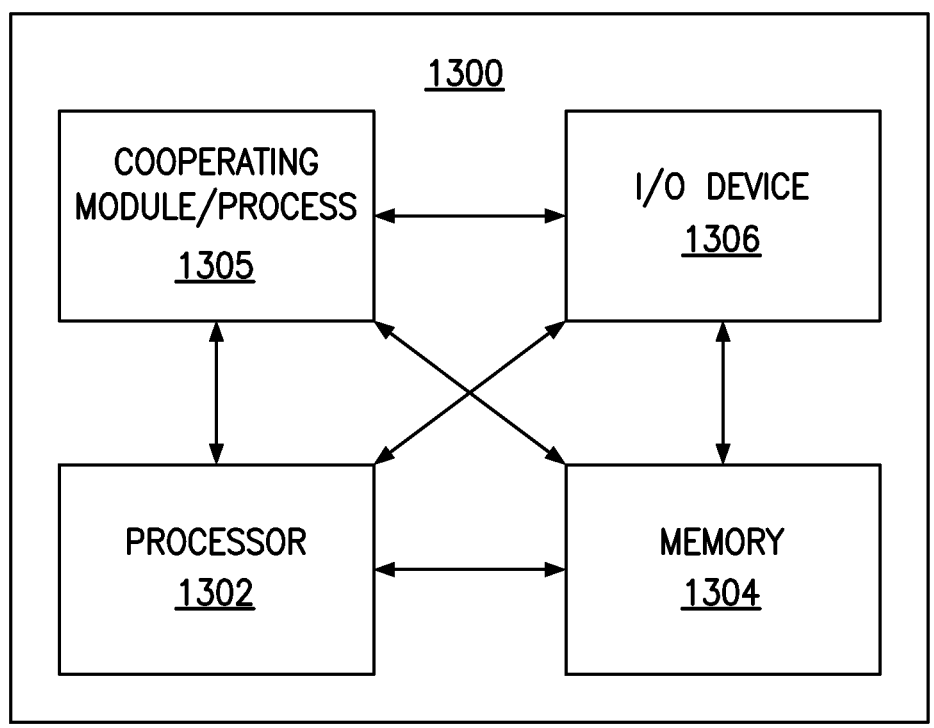
FIG. 13 depicts a high-level block diagram of a computer suitable for use in performing functions described herein. Specific embodiments of the invention are disclosed below with reference to the Figures. Both the description and the illustrations have been drafted with the intent to enhance understanding. For example, the dimensions of some of the figure elements may be exaggerated relative to other elements, and well-known elements that are beneficial or even necessary to a successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

FIG. 13 depicts a high-level block diagram of a computer suitable for use in performing functions described herein. The computer 1300 includes a processor 1302 (e.g., a central processing unit (CPU) or other suitable processor(s)) and a memory 1304 (e.g., random access memory (RAM), read only memory (ROM), and the like).

The computer 1300 also may include a cooperating module/process 1305. The cooperating process 1305 can be loaded into memory 1304 and executed by the processor 1302 to implement functions as discussed herein and, thus, cooperating process 1305 (including associated data structures) can be stored on a computer readable storage medium, e.g., RAM memory, magnetic or optical drive or diskette, and the like.

The computer 1300 also may include one or more input/output devices 1306 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1300 depicted in FIG. 13 provides a general architecture and functionality suitable for implementing functional elements described herein or portions of functional elements described herein. For example, the computer 1300 provides a general architecture and functionality suitable for implementing one or more of FIG. 10's Command Center Unit 1010, TxM, and Receiver 1020, or the like.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of one or more of the methods described herein. The program storage devices may be non-transitory media, e.g., digital memories, magnetic storage media such as a magnetic disks or tapes, hard drives, or optically readable digital data storage media. In one or more embodiments, tangible medium excluding signals may include a set of instructions which when executed are operable to perform one or more of the descried methods. The provided embodiments are also intended to be embodied in computers programmed to perform said steps of methods described herein.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

The invention claimed is:

1. A method of tactical communication, the method comprising:
    receiving information indicating a tactical situation associated with a target area, wherein the tactical situation is one of a missile in-flight, an eavesdropper, a signal jammer, and a transceiver located in the target area;
    performing a beamforming process including instructing transmission of a first set of one or more signaling beams from a first set of one or more transmitters toward the target area;
    performing a second beamforming process including instructing transmission of a second set of one or more signaling beams from a second set of one or more transmitters toward the target area; and
    simultaneously transmitting (i) the first set of one or more signaling beams from the first set of one or more transmitters toward the target area and (ii) the second set of one or more signaling beams from the second set of one or more transmitters toward the target area, wherein the second set of one or more transmitters is not co-located with the first set of one or more transmitters.

2. The method of claim 1 wherein performing the second beamforming process comprises:
    determining the second set of one or more signaling beams of the second set of one or more transmitters according to an algorithm known to the transceiver located in the target area;
    explicitly communicating an identity of the second set of one or more signaling beams of the second set of one or more transmitters to the transceiver located in the target area via a well protected channel; or
    conveying the identity of the second set of one or more signaling beams of the second set of one or more transmitters to the transceiver located in the target area using hints or secret codes that are mutually known to the second set of one or more transmitters and the transceiver.

3. The method of claim 1, wherein the tactical situation is associated with a first foe, and wherein the plurality first and second sets of signaling beams are for generating interference inhibiting communication by the first foe with a second foe.

4. The method of claim 1, wherein the tactical situation is associated with a friend, and wherein the first and second sets of signaling beams are for generating decodable signal for enhancing communication with the friend.

5. The method of claim 1 further comprising:
determining the target area associated with the tactical situation; wherein the target area is a present location of the tactical situation or an anticipated future location of the tactical situation.

6. The method of claim 1 further comprising at least one of:
determining the first set of one or more transmitters from a set of transmitters available for transmission to the target area;
determining the first set of beams from a set of beams available at the first set of one or more transmitters; and
determining resources from a set of communication resources available to operate on the first set of beams of the first set of one or more transmitters.

7. The method of claim 6 wherein the set of communication resources available to operate include one or more physical layer parameters including at least one of a frequency, channel, time, space, power, and a code sequence.

8. The method of claim 1 wherein performing the beamforming process comprises:
performing joint beam scheduling with the first set of one or more transmitters, wherein the first set of one or more transmitters is part of a set of transmitters that are capable of serving the target area.

9. The method of claim 8 wherein performing joint beam scheduling with the first set of one or more transmitters that are capable of serving the target area comprises:
calculating a joint beamforming vector on a per-user basis using at least one of instantaneous channel feedback information or measured channel feedback information.

10. Network equipment for performing the method according to claim 1 in a communication system, the network equipment being configured to communicate with other equipment in the system, the network equipment including a processor and an associated memory unit, the processor configured to:
receive information indicating a tactical situation associated with a target area, wherein the tactical situation is one of a missile in-flight, an eavesdropper, a signal jammer, and a transceiver located in the target area; and
perform a beamforming process including instructing transmission of the first set of one or more signaling beams from the first set of one or more transmitters toward the target area, wherein:
the network equipment further includes the first set of one more transmitters and the second set of one or more transmitters;
the second set of one or more transmitters is not co-located with the first set of one or more transmitters; and
the network equipment is further configured to simultaneously transmit (i) the first set of one or more signaling beams from the one or more transmitters toward the target area and (ii) the second set of one or more signaling beams from the second set of one or more transmitters toward the target area.

11. The network equipment of claim 10 wherein the processor is configured to determine the tactical situation is associated with a first foe, and wherein the first and second sets of signaling beams are for generating interference for inhibiting communication by the first foe with a second foe.

12. The network equipment of claim 10 wherein processor is configured to determine the tactical situation is associated with a friend, and wherein the first and second sets of signaling beams are for generating decodable signal for enhancing communication with the friend.

13. The network equipment of claim 10 wherein processor is configured to determine the target area associated with the tactical situation, wherein the target area is a present location of the tactical situation or an anticipated future location of the tactical situation.

14. The network equipment of claim 10 wherein processor is configured to at least one of:
determine the first set of one or more transmitters from a set of transmitters available for transmission toward the target area;
determine the first set of beams from a set of beams available at the first set of one or more transmitters; and
determine resources from a set of communication resources available for operation of the first set of beams of the first set of one or more transmitters.

15. The network equipment of claim 10 wherein the one or more transmitters are capable of serving the target area, wherein the processor is configured to
perform joint beam scheduling with a set of transceivers that are capable of serving the target area to determine the first set of one or more transmitters; and
signal a joint beam schedule to the first set of one or more transmitters.

16. The network equipment of claim 10 further comprising the first set of one or more transmitters.

17. The network equipment of claim 10, wherein:
the tactical situation is of a missile in-flight;
the missile in-flight comprises the other equipment in the system; and
the first and second sets of signaling beams from the first and second sets of one or more transmitters are adapted to overcome a jamming attempt of the missile in-flight.

18. The network equipment of claim 10, wherein:
the tactical situation is a missile in-flight; and
the first and second sets of signaling beams from the first and second sets of one or more transmitters are directed toward the missile in-flight and adapted to jam communication with the missile in-flight by a foe.

* * * * *